United States Patent [19]

Meller et al.

[11] 3,853,239

[45] Dec. 10, 1974

[54] CARGO CONTAINER HAVING ADJUSTABLE SHELVES

[75] Inventors: Oscar W. Meller; John W. Lovich; Frank C. Morse, all of Akron, Ohio

[73] Assignee: Goodyear Aerospace Corporation, Akron, Ohio

[22] Filed: Mar. 29, 1973

[21] Appl. No.: 346,211

[52] U.S. Cl. .................................. 220/1.5, 220/84
[51] Int. Cl. ............................................. B65d 87/00
[58] Field of Search ............. 220/1.5, 4, 10, 15, 83, 220/84

[56] References Cited
UNITED STATES PATENTS

| | | | |
|---|---|---|---|
| 3,598,273 | 8/1971 | Rau.................................. | 220/10 X |
| 3,618,803 | 11/1971 | Dobberkau ........................ | 220/1.5 |
| 3,632,029 | 1/1972 | Sonner............................... | 150/3 X |
| 3,672,529 | 6/1972 | Fedderson et al. ................ | 220/1.5 |
| 3,692,203 | 9/1972 | Byrd et al. ........................ | 220/1.5 |
| 3,706,392 | 12/1972 | Morse et al....................... | 220/1.5 X |

*Primary Examiner*—Donald E. Watkins
*Attorney, Agent, or Firm*—Oldham & Oldham

[57] ABSTRACT

Disclosed is a unique lightweight yet sturdy cargo container having shelves provided for the secure orderly storage of goods. Access doors to the container are of a basic fabric structure having reinforcing rigid beams provided for added strength. The door is secured to the body of the container by means of a velcro closure positioned such that forces incident to the door will create shear in the closure. The door is readily storable atop the container and may be quickly secured thereto. The shelves are removable and adjustable and may readily be stored along the top or bottom of the cargo container and may be used as either ordinary shelves or securing means for the cargo contained therebelow. Vertical beams and headers are provided in flange connected engagement to provide added strength to the body of the container so as to resist torque created by unbalanced loading.

9 Claims, 6 Drawing Figures

CARGO CONTAINER HAVING ADJUSTABLE SHELVES

BACKGROUND OF THE INVENTION

Heretofore various types of cargo containers have been utilized by the transportation industry to facilitate the handling of baggage and other cargo. However, most of these containers have been of the type to provide bulk storage capabilities for the cargo to be transported. Few, if any, have provided means for storing the various cargo within the container in an orderly fashion. Further, known cargo containers have not provided simplistic means for securing cargo within the container when the container is less than full.

Presently available cargo containers generally utilize doors for achieving access to the interior of the container which are of a solid or corrugated metal material. This type of door adds increased weight to the container and further complicates the operability thereof. These doors have been of such nature as to make the storage thereof difficult while the cargo container is being loaded or unloaded. Further, the apparatus required for sealing such doors to the general body of the cargo container have been complex in nature, with much time being consumed in effectuating the seal.

It has further been known that design requirements of many known cargo containers have dictated that one end of the cargo container overhang the base of the container; this situation causing a torque to be exerted on many of the members of the container when the overhanging portion is loaded. This of course has a tendency to eventually distort the physical composure of the container.

Consequently, it is an object of the instant invention to present a cargo container wherein a plurality of adjustable shelves are provided so that cargo may be stored in a neat, orderly fashion.

It is a further object of the invention to provide a cargo container wherein the adjustable shelves may be utilized in securing the cargo within a container which is less than full.

Yet another object of the invention is to present a cargo container wherein the access doors thereof are of a light but tough fabric, the fabric being reinforced by bars received within socks of the fabric door.

Still another object of the invention is to present a cargo container wherein the access doors thereof are readily storable on top of the cargo container, being retained thereon by hold down straps, and wherein the doors may be quickly and securely sealed to the body of the cargo container.

Still another object of the invention is to present a cargo container wherein vertical beams and headers are provided in a flange connected engagement to provide added strength to the body of the cargo container so as to resist torque created about the elements of the container by loading of the overhanging portion.

These objects and other objects which will become apparent as the detailed description proceeds are achieved by a baggage cargo container comprising: a substantially cubicle framework connecting a top, base, end panels, and trapezoidal end section; at least one fabric door connected in a sealed manner along one edge thereof to the cubicle framework; sealing means about the remaining edges of the fabric door for effectuating seals between the fabric door and the cubicle framework; adjustable securing means within the container for securing cargo contained therein between the securing means and a portion of the cargo container; and a floor leveling means within the trapezoidal section for providing a level base within that section for storing luggage or baggage.

For a full understanding and appreciation of the apparatus comprising the invention reference should be had to the detailed description and accompanying drawings whrerein:

Figure 1:
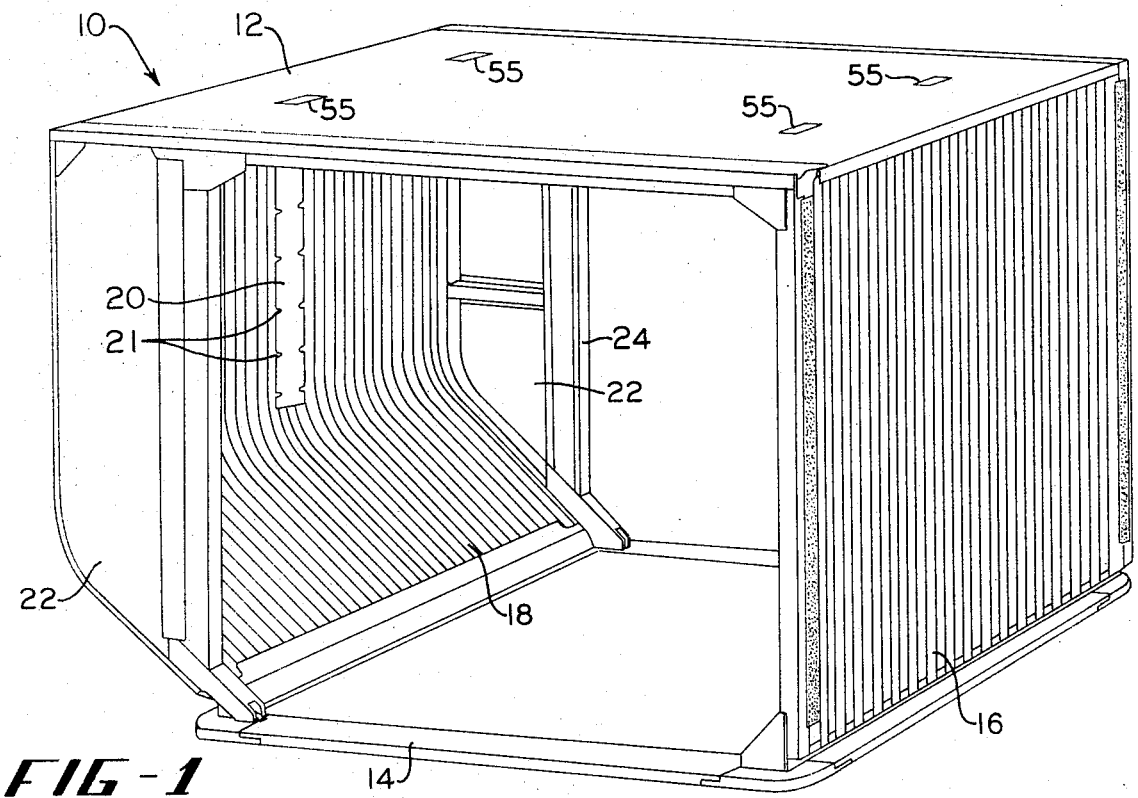
FIG. 1 is an elevational plan view of a cargo container according to the teachings of the invention.

Referring now to the drawings and more particularly FIG. 1, a plan view of a cargo container according to the teachings of the instant invention may be seen. It should be noted that this cargo container, designated generally by the numeral 10, does not have the doors attached thereto so as to facilitate a view of the interior of the container. As can be seen, the container 10 comprises a top 12, a base 14, inboard and outboard end panels 16 and 18 respectively, a shelf receiving bracket 20 having adjustment notches 21 thereon, and trapezoidal end panels 22 defining a portion of the cargo container 10 extending beyond the confines of the base 14. While the particular structure of the cargo container shall be described in more detail hereinafter, it should be understood from reference to FIG. 1 that the cargo container is substantially cubicle in shape having an overhanging trapezoidal storage portion extending from one end of the cube.

Figure 2:
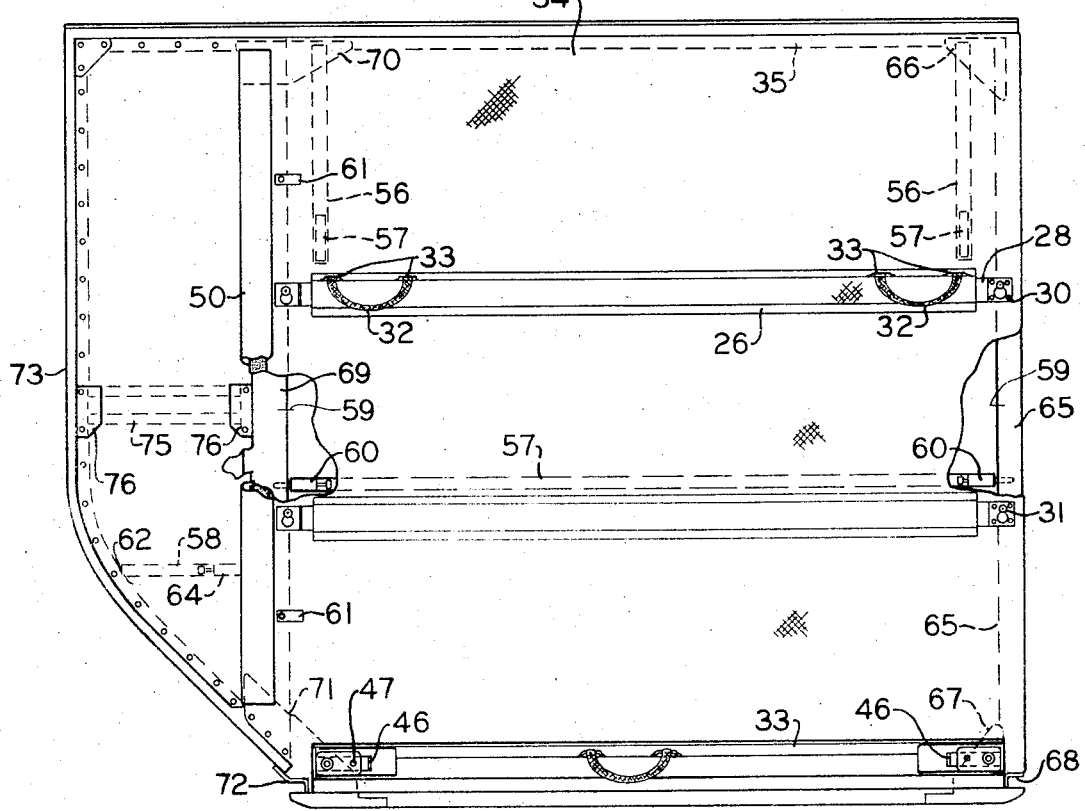
FIG. 2 is a front view of the container.
Figure 3:
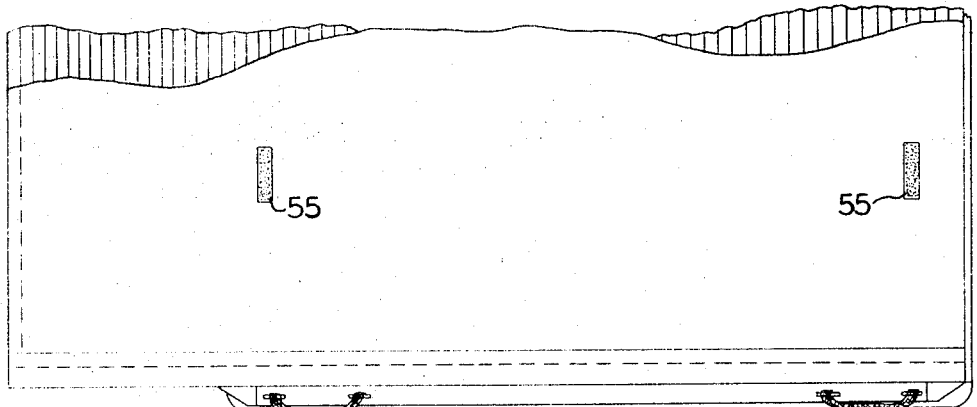
FIG. 3 is a partial top view of the cargo container.
Figure 4:
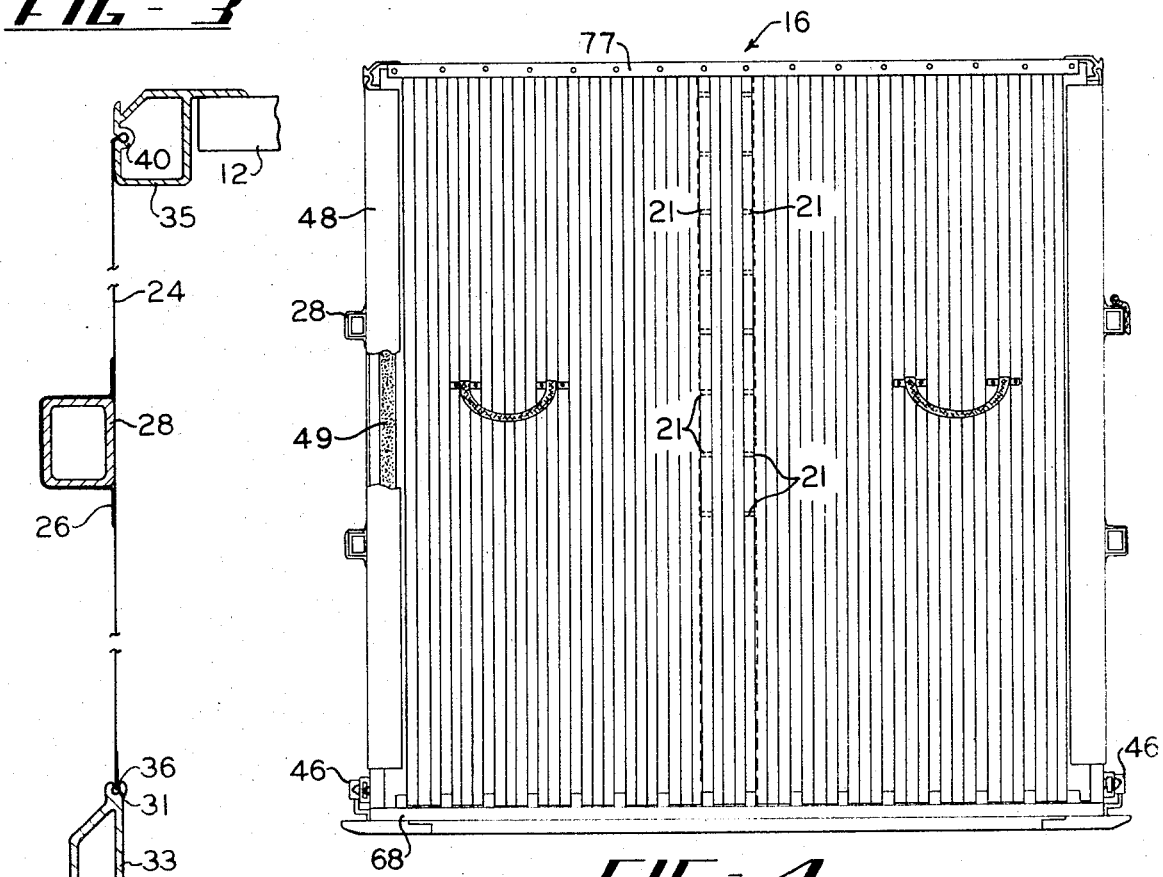
FIG. 4 is a side view of the inboard end panel of the cargo container.

Referring now to FIGS. 2, 3 and 4, front, top, and side views of the cargo container comprising the instant invention may be seen. As is shown in FIG. 2, the door 24 utilized for achieving access to the interior or the cargo container is to be of a laminated vinyl nylon material so as to provide strength, and flexibility while being lightweight. There are of course two such doors provided in each cargo container, the one onthe front as shown in FIG. 2, and a similar door on the opposite side of the cargo container. Each of the fabric doors 24 are characterized by the presence of fabric socks 26 containing rigid beams 28 therein. The rigid beams 28 are connected to the socks 26 by an appropriate means. The beams 28 and socks 26 may be interconnected by means of strap-I connectors 33 receiving straps or other flexible handle means 32 therein. At each end of the beam 28 is provided a key slot connector 30 which may make securing engagement with a button 31 connected to and protruding from the metal door frame of the cargo container. As can be seen, there are provided two such rigid beams 28 which effectively divide the fabric door 24 into three sections. The two rigid beams give strength and support to the fabric door 24 so as to prevent bulging thereof or application of undue force thereto when the cargo within the container shifts.

Figure 5:
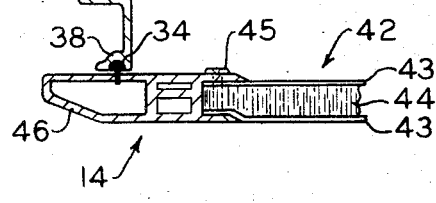
FIG. 5 is a partial sectional view of the cargo container taken along the line 5—5 of FIG. 2.

As can be seen in FIG. 5, the fabric door 24 has connected thereto at the lower bottom portion thereof a base beam 33. An enlarged bead 36 on the fabric door 24 sealingly engages with a groove 37 longitudinally running along the top portion of the base beam 33. A second groove running longitudinally along the length of the base beam 33 is present in the lower flange 38. This groove is present to sealingly receive the rubber extruded seal 34 which is fixedly attached to the front edge 39 of the base 14. Of course, the seal 34 could be fixedly attached to the flange 38 and make sealing engagement with the edge 39. The fabric wall 24 is fixedly attached to the header 35 by the bead and groove engagement shown at 40. The bead and groove engagements at 40 and 36, 37 provide waterproof seals between the fabric wall 24 and the elements to which it is attached.

As can further be seen in FIG. 5, the header 35 sealingly engages the top 12 by means of the provision of sealing tape 41 therebetween. As is also shown, the edge 39 which is provided about the entire periphery of the base 14 of the cargo container is of an extruded aluminum construction and engages the sandwich panel 42 of the base 14 in a tongue and groove fashion, secured by rivets 45 of other securing means. It will be understood that the rivets 45 may be readily removed so that the sandwich panel 42 may be replaced when excessively worn. The sandwich panel 42 comprises a balsa wood core 44 engaged between two thin aluminum sheets 43. As can further be seen in FIG. 5, the extruded edge member 39 protrudes outwardly in a tapered fashion toward the edge 46 thereof so as to provide means for engaging with brackets or braces provided in proper spaced relationship in the aircraft cargo floor.

As can best be seen in FIG. 2, the base beam 33 is provided at each end thereof with slide latches 46. These slide latches 46 may be of any suitable nature but are contemplated to be similar to those described in U.S. Patent Application Ser. No. 201,590, filed on Oct 27, 1971 and now U.S. Pat. No. 3,752,520.

These slide latches are provided with a receptacle 47 through the slide mechanism thereof whereby security wire may be engaged to prevent the movement of the slide after the door has been sealed. Further security wire receptcles 61 may also be provided along the door.

Provisions are made whereby the fabric door 24 may be sealed along the vertical edges thereof to the remaining structure of the cargo container. As can be seen in FIG. 4, a flap 48, comprising a portion of the fabric door 24, extends so that it may wrap partially around the side of the cargo container. The underside of the flap 48 contains thereon the piled portion of a velcro closure. The hooked portion 49 of the velcro closure is affixed to the inboard end panel 16. When the fabric door 24 has been positioned so that the extruded rubber seal 34 is effectuated along the front edge 39 and the slide latches 46 and the key slot connectors 30 secured, the flap 48 may be wrapped about the inboard end panel 16 so as to effectuate the velcro closure. It is well known to those skilled in the art, that such a closure is extremely strong in shear and provides a weather tight seal.

Figure 6:
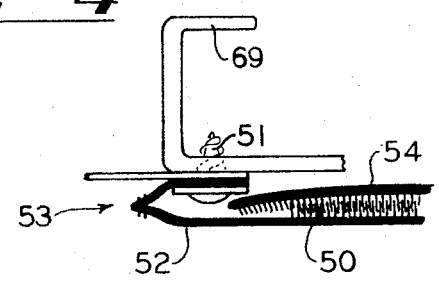
FIG. 6 is a cross-sectional view of a vertical beam having a velcro closure attached thereto.

A similar velcro closure or strip 50 is provided along the other vertical side of the fabric door 24. In this situation however the flap of the velcro closure 50 is affixed to a vertical post 69 of the cargo container as is shown in FIG. 6 rather than being an extension of the fabric door 24. As can be seen in FIG. 6, the flap 52 of the closure strip 50 is folded back on itself once at 53 and is sealingly engaged along the post 69 by a plurality of bolts 51. A sealing tape may also be used to effectuate the seal. The other portion of the velcro sealing closure designated by the numeral 54 is directly adhered to the fabric door 24. As can be seen, when pressure is placed against the fabric door 24 from the inside of the cargo container the closure strip 50 will move outwardly with the door until such point that the slack created by the fold 53 in the closure strip 50 is all taken up. At that point in time the force being exerted on the closure strip 50 will be a shearing force as is the force exerted between the elements 48 and 49 along the other side of the door 24. Since the velcro closures are strongest in shear, it can be seen that an effectively strong weather tight seal has been made along the vertical edges of the fabric door 24.

As can be seen from FIGS. 2 and 3, hook pads 55 are provided on the top 12 of the cargo container. Wind hold down straps 56 having pile pads 63 on the ends thereof are suspended from the inside of the cargo container and the top thereof. When access is to be made to the interior of the cargo container the fabric door 24, including the rigid beams 28 and the base beam 33, may be rolled from the bottom upwardly and placed on the top 12 of the cargo container. The pads 63 of the wind hold down straps 56 may then be caused to engage with the pads 55 on the top 12, thus securing the fabric door thereon. These strips guarantee that the door 24 will remain atop the container 10 regardless of wind or other weather conditions while the container is being loaded.

The instant invention uniquely provides a plurality of shelves whereby the secure orderly storage of cargo may be achieved. Two large shelves 57 may be provided to extend the full width of the container while a smaller shelf 58 may be provided in the trapezoidal portion thereof. The two large shelves 57 have stationary pins (not shown) in the ends thereof to slip within the adjustment notches 21 of the shelf receiving bracket 20 as shown in FIG. 1. The front of the shelves 57 have sliding spring loaded pints 60 at the edges thereof to lock with any of a number of holes 59 provided in the vertical posts 65, 69 of the cargo container. Thus the shelves 57 are adjustable in height in accordance with the positioning of the notches 21 and the holes 59. If the cargo container is to be completely filled the shelves 57 may be placed in the topmost holes and notches so as to be transportedly stored in the top of the cargo container. If the cargo container is to be filled to less than capacity, the shelves 57 may be brought down and positioned at the top of the load so as to secure the load between the shelves 57 and the base 14. Of course, the shelves 57 may further be used for separately storing various articles, such being the common use of shelves.

The small shelf 58 provided in the trapezoidal area of the cargo container is connected to the outboard end panel 18 by means of a hinge 62. Sliding spring loaded pins 64 are provided at each end of the shelf 58 to engage with holes (not shown) in vertical beams of the cargo container. Thus it can be seen that the shelf 58 may be utilized to provide a flat bottom in the trapezoidal section of the cargo container or it may be folded down along the bottom thereof so that the container may be utilized for bulk storage.

The physical structure of the cargo container may readily be seen by reference to FIGS. 2, 3 and 4. Two posts 65 are provided on the fore and aft sides of the inboard end panel. The posts 65 are of a flanged channel aluminum extrusion, connected to the header 35 by means of the bracket 66 and to the edge 39 by meanas of the brace 65 and rail 68 bolted or appropriately affixed thereto. The outboard side of the container 10 is characterized by the presence of posts 69 on the fore and aft side of the container beside the fabric door assembly 24. The post 69 is connected to the post 73 defining the trapezoidal end section and the edge 39 by means of the bracket 71 and rail 72. The post 69 is further connected to the header 35 by means of the trapezoidally shaped bracket 70 bolted or appropriately affixed thereto. It is the bracket 70 connecting the header 35 to the vertical post 69 which serves to reduce distortion from the torque-like effect created by the loading of the overhanging trapezoidal section. The strengthening of the container frame work by the braces 70 and 71 provide truss-like force paths for resisting any distorting forces.

The rail 73 defining the trapezoidal end panel is connected to the header 35 by means of the bracket 74. Further horizontal strength is added to this trapezoidal section by means of the stiffner 35 comprising an extruded aluminum channel connected between the posts 69 and 73 by means of the brackets 76.

It is contemplated that the end panels 16, 18 will be of corrugated alclad aluminum with extrusions rivetted along the bottom edges thereof to form flanges for the connection to the base as is well known and understood to those skilled in the art. The trapezoidal panel 22 will be an aluminum sheet attached by screws to the outboard end panel 18, the door header 35, and the vertical post 69. The top 12 is preferably of a corrugated alclad aluminum sheet with the corrugations running in the fore and aft directions. The inboard and outboard edges of the top are attached to the top of the container sides by a formed flange 77. The fore and aft edges are rivetted to the extruded aluminum beams comprising the door headers 35. A thin flat sheet of alclad aluminum may be used to cover the top 12 so as to provide a smooth surface to facilitate the removal of snow and to prevent the accumulation of water on top of the container.

Thus it can be seen that the objects of the invention have been satisfied by the apparatus described herein and shown in the drawings. While in accordance with the patent statutes only the best known and preferred embodiment of the invention has been presented and described in detail, it is to be understood that many variations on the theme thereof may be developed while still remaining within the teachings of this invention. Consequently, for an appreciation of the contemplated scope and breadth of the invention reference should be had to the appended claims.

What is claimed is:

1. A baggage cargo container, comprising:
   a substantially cubicle framework connecting a top, base, end panels, and trapezoidal end section;
   at least one fabric door connected in a sealed manner along one edge thereof to the cubicle framework;
   sealing means about the remaining edges of the fabric door for effectuating seals between the fabric door and the cubicle framework;
   adjustable securing means within the container for securing cargo container therein between the securing means and a portion of the cargo container; and
   a floor leveling means within the trapezoidal section for providing a level base within that section for storing luggage or baggage.

2. A baggage cargo container as recited in claim 1 wherein the fabric door has attached thereto at least one sock securely engaging a rigid beam adaptable to interlock with the cubicle framework to restrain forces exerted upon the fabric door.

3. A baggage cargo container as recited in claim 2 wherein the fabric door is sealingly attached to a base beam having sliding locks at each end thereof to lockingly engage the fabric door with the framework and wherein the sealing means comprises a rubber seal operatively engaging the bottom of the fabric door and the base of the cargo container and a flap on one edge of the fabric door and a flap on one side of the cargo container framework, the flaps respectively sealingly mating with a sealing strip on another side of the cargo container framework and a sealing strip on another edge of the fabric door.

4. A baggage cargo container as recited in claim 3 wherein the flaps and sealing strips comprise velcro closures and the rubber seal is effectuated by a bead and groove engagement, and wherein the flap on one side of the cargo container framework is folded over on itself such that forces imparted to the velcro closures by forces from within the cargo container upon the door will be shearing forces.

5. A baggage cargo container as recited in claim 4 wherein the top of the container is of corrugated aluminum covered with a flat thin sheet having at least one sealing strip thereon to engage with a sealing strap attached at one end to the cargo container whereby the fabric door may be securedly stored atop the container, and wherein the framework of the container includes verticle posts connecting the top and base, being bracketed to a header at the top and the base at the bottom, the header running the entire length of the container and supporting, through the bracketed vertical post, the trapezoidal end section.

6. A baggage cargo container as recited in claim 5 wherein the adjustable securing means comprises at least one shelf having engaging means at each end thereof, and wherein a bracket with a first plurality of receiving means is provided at each end of the cargo container and wherein at least one of the verticle posts has a second plurality of receiving means, the first and second receiving means receiving the engaging means to retain the shelf at a preselected level.

7. A baggage cargo container as recited in claim 6 wherein the floor leveling means conprises a shelf pivotally connected to the end panel enclosing the trapezoidal section, the shelf having means thereof for engaging with at least one of the vertical posts of the cargo framework to retain the shelf in a fixed position.

8. A baggage cargo container as recited in claim 7 wherein at least certain of the engaging means of the adjustable securing means and at least certain of the means for engaging of the floor leveling means comprise spring loaded sliding pins.

9. A cargo container, comprising:
   a top, base, and ends of metal construction flangedly connected to each other and bracketedly connected to a plurality of verticle posts;

a fabric door sealingly connected to the top by a bead and groove engagement, the door having first hook and pile closure elements along the sides thereof and a groove at the base thereof for receiving an extruded rubber seal connected to the base;

second hook and pile closure elements connected to the verticle posts for mating with the first hook and pile closure elements in a sealing engagement whereby forces imparted to the closures from within the container will create shear in the closures;

adjustable shelves within the container adjustably connected to the vertical posts; and a pivotal shelf running transverse to the adjusutable shelves and removably connected to certain vertical posts when in use anad pivotal about a hinge to lie adjacent an end panel of the container when not in use.

* * * * *